(12) United States Patent
Bogl et al.

(10) Patent No.: US 6,511,393 B1
(45) Date of Patent: Jan. 28, 2003

(54) CLAMPING DEVICE FOR A TRACTION MEANS

(75) Inventors: Arno Bogl, Gaisbach (DE); Rudolf Polster, Baiersdorf (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/830,812

(22) PCT Filed: Oct. 16, 1999

(86) PCT No.: PCT/EP99/07861

§ 371 (c)(1),
(2), (4) Date: May 11, 2001

(87) PCT Pub. No.: WO00/26560

PCT Pub. Date: May 11, 2000

(30) Foreign Application Priority Data

Oct. 29, 1998 (DE) .......................... 198 49 659

(51) Int. Cl.$^7$ ................................ F16H 7/08
(52) U.S. Cl. ........................ 474/101; 474/134
(58) Field of Search ................ 474/101, 133, 474/134, 141, 5

(56) References Cited

U.S. PATENT DOCUMENTS

| | | |
|---|---|---|
| 2,066,721 A | 1/1937 | Eaton |
| 2,954,726 A | 10/1960 | Kerridge |
| 3,757,683 A * | 9/1973 | Engebretsen et al. ... 100/229 A |
| 4,128,952 A * | 12/1978 | Duke et al. ...................... 37/8 |
| 4,530,682 A * | 7/1985 | Gruber et al. ............... 474/133 |
| 4,758,208 A * | 7/1988 | Bartos et al. ............... 474/135 |
| 5,002,519 A * | 3/1991 | Oshima et al. ............. 474/134 |

FOREIGN PATENT DOCUMENTS

| | | | |
|---|---|---|---|
| CH | 351470 | 7/1957 | |
| DE | 510964 | 10/1930 | |
| DE | 4243451 | 6/1994 | |
| EP | 0097987 | 1/1984 | |
| EP | 0486984 | 5/1992 | |
| JP | 6-94091 * | 5/1994 | F16H/7/12 |

* cited by examiner

Primary Examiner—David A. Bucci
Assistant Examiner—Timothy McAnulty
(74) Attorney, Agent, or Firm—Bierman, Muserlian and Lucas

(57) ABSTRACT

The invention relates to a clamping device (6) for a traction means (2) of a drive system (1) which produces different pretensioning forces in a first strand (2a) and in a second strand (2b) by means of a turning lever (8, 11), the length ratio between the corresponding inner lever arm (8a, 11a) and the corresponding outer lever arm (8b, 11b) being different.

3 Claims, 3 Drawing Sheets

CLAMPING DEVICE FOR A TRACTION MEANS

FIELD OF THE INVENTION

The invention concerns a tensioning device for a traction element of a drive arrangement, said tensioning device comprising a tensioner-damper unit, a first tension element in contact with the traction element and a second tension element in contact with the traction element, with following features:

- the tensioner-damper unit acts between a first pivoting lever and a second pivoting lever,
- the first tension element is connected to the first pivoting lever,
- the first pivoting lever is mounted on a fulcrum for pivoting about a first fixed axis of pivot,
- the first tension element is urged by the first pivoting lever, under action of the tensioning force of the tensioner-damper unit, against a first strand,
- the second tension element is connected to the second pivoting lever,
- the second pivoting lever is mounted on a fulcrum for pivoting about a second fixed axis of pivot,
- the second tension element is urged by the second pivoting lever, under action of the tensioning force of the tensioner-damper unit, against a second strand,
- a deflector pulley for the traction element is arranged between the first strand and the second strand and
- the first strand and the second strand are subjected to unequal tractive forces.

BACKGROUND OF THE INVENTION

A tensioning device of the pre-cited type is known from DE 42 43 451 A1. This tensioning device is made up of two pivoting levers each of which has a tension element, a tensioner and a damping element arranged between the pivoting levers. The tension elements are preferably configured as tension rollers. The pivoting levers are fixed at one end on an axis of pivot for pivoting relative to each other. A tension roller is rotatably fixed on the other ends of the pivoting levers. Under the action of the tensioning force of the tensioner, the pivoting levers are urged by their tension rollers against the traction element, one of the pivoting levers acting on a slack strand and the other of the pivoting levers acting on a tight strand. A damping element acting equally on both pivoting levers is arranged between the pivoting levers. Through the tractive or compressive force of its spring system, the tensioner acts simultaneously on both pivoting levers. The tensioner and the damper are preferably combined into a tensioner-damper unit in a single assembly.

The term "strand" designates that part of a traction element that is situated between two adjacent deflector pulleys of a drive arrangement. The deflector pulley can act:

- as a pure deflecting device for the traction element, in which case, no or only an insignificant amount of power is drawn from the drive arrangement by the deflector pulley,
- as a deflecting device and simultaneously as a driven pulley, for example as a pulley of a generator, in which case, power is drawn from the driving arrangement,
- as a deflector pulley and simultaneously as a driving pulley, for example as a belt pulley of a crankshaft, in which case, power is fed to the drive arrangement.

In a drive arrangement, the slack strand is that part of the traction element that follows after a driving pulley in the direction of rotation and thus in the driving direction, while the tight strand is the entrained part of the traction element which follows directly after the driving pulley in the direction opposite to the driving direction, and/or is arranged between two driven pulleys in this direction. A slack strand is thus subjected to other tractive forces than a tight strand i.e., the tractive forces in the slack strand are lower than those in a tight strand.

The function of such a tensioner-damper unit is to compensate for length variations of the traction element that occur during or in the course of its operation and act particularly in the slack strand, and also to offset the consequences of torsional vibrations of the driving pulley, for example, of the belt pulley of a crankshaft. Length variations of the traction element are compensated for in order to achieve a uniform wrap of the traction element on the deflector pulleys in all conditions of operation during the entire operative life of the driving arrangement. Vibrations are compensated for by the damping element to keep the driven pulleys and the aggregate units that are connected thereto free of cyclic irregularities. By a uniform i.e., slip-free wrap on the driven pulleys, the driving power is transmitted with insignificant losses. At the same time, the traction element is subjected to high loads. The aim in view is to adapt the tensioning force applied to the strand by the tensioner to the power requirement or the power output of the associated deflector pulley. This means that, when the requirement of power is low, the traction element should also be pre-tensioned only with a low tensioning force. At a higher power flow, the tensioning force must also be higher. Therefore, ideally, the level of loading of the traction element should only be as high as required by the actual power flow.

It is difficult to achieve an ideal loading of the traction element when the tensioning device has to produce different tensioning forces for each of the strands to be tensioned for achieving an ideal loading of the traction element. This is the case, for example, when the tensioning device is to be used between a strand arranged on the left of a deflector pulley and a strand arranged on the right of the deflector pulley, and the left-hand strand, depending on the operative state of the drive arrangement, is, at one time, a tight strand while the right-hand strand is a slack strand, and at another time, the left-hand strand becomes a slack strand while the right-hand strand becomes a tight strand. An example of this are the strands on the left and the right of a belt pulley of a starter-generator unit that are integrated in a belt drive of an internal combustion engine. When the generator works as a starter, the strand between the belt pulley of the starter-generator unit and the belt pulley of the crankshaft is a tight strand and the strand on the other side of the belt pulley of the starter-generator unit is a slack strand. When the internal combustion engine has been started, the belt is entrained by the belt pulley of the crankshaft in the same direction of rotation and drive and the strand between the belt pulley of the starter-generator unit and the belt pulley of the crankshaft is a slack strand, while the strand on the other side of the belt pulley of the starter-generator unit is a tight strand.

During the starting operation, the forces in the tight strand between the belt pulley of the starter-generator unit and the belt pulley of the crankshaft are very high because when the internal combustion engine is being started by the starter-generator unit, the moments of drag for entraining the crankshaft are very high. The forces of the strand on the other side of the belt pulley of the starter-generator unit are not so high when this strand is a tight strand because, in this case, the aggregate units are entrained by the driving crankshaft. If, as mentioned above, the belt is to be pre-tensioned ideally only in correspondence to the power flow and thus in correspondence to the effective forces, the tensioner-damper unit must apply different forces to each strand depending on the aforesaid operative states of the internal combustion engine.

A drawback of the prior art tensioning device or tensioner-damper unit when used in an arrangement of the type described above is that the distribution of tensioning force among the deflector pulleys is not satisfactory. For pre-tensioning the left and right strands in keeping with their loading, the prior art requires for each strand, a tensioner specially matched to its particular loading. A prior art traction element drive of this type is described in U.S. Pat. No. 2,954,726. The traction element in this drive arrangement is a chain. The drive arrangement can be operated selectively in clockwise or anti-clockwise direction. Each of the opposite strands is loaded by a lever acting through a tension roller. Each lever is actuated by a spring system that is independent of the spring system acting through the other lever on the other strand. Such a solution does not permit any power-dependent control of the spring-damper characteristic and, due to double the number of individual components, disadvantageously affects the overall costs of such a drive arrangement.

SUMMARY OF THE INVENTION

The object of the invention is therefore to create a tensioning device that acts on two strands that have different tractive forces, that pre-tensions the strands by only one tensioner and in which the tension forces are adapted to the differing tractive forces.

This object is achieved according to the characterizing part of claim 1 in that the pivoting levers of the tensioning device are formed by lever arms, one inner lever arm and one outer lever arm, that extend from the fulcrum of each pivoting lever. The free end of the outer lever arm of each pivoting lever is connected to a tension element, preferably a tension roller. The free end of the inner lever arm of each pivoting lever is articulated on one end of the tensioner-damper unit. The tensioner-damper unit is not stationary i.e., it is only secured between the inner lever arms and transmits, with a damping effect, the reaction forces occurring during the tensioning operation between the first and the second strand. The lengths of the inner and the outer lever arms of each pivoting lever are configured in a defined ratio to each other. This length ratio is different for each of the pivoting levers. It is matched to the required tensioning forces, that differ from strand to strand, for tensioning each strand. Since each pivoting lever is pivoted on its of pivot for pivoting about a stationary axis of pivot, the tensioning force of the tensioner is transmitted to the tension element and thus to the strand concerned, with a lever action corresponding to this ratio. This ratio determines whether the tensioning force of the tensioner is decreased or in creased by the pivoting lever before transmission to the tension element. The different specific ratios of the lengths of the pivoting levers form a common system of levers in the tensioning de vice. This lever system changes its leverage in keeping with the reaction force s transmitted from one strand to the other. The advantage of such a tensioning device is particularly that the tensioning fores can be differently defined from strand to strand, a variation of the tensioning forces is possible by replacing the pivoting levers with pivoting levers having a different length ratio, only one tensioner-damper unit is required, tensioning devices having different tensioning and damping characteristics can be designed by any suitable combination of tensioner-damper units and pivoting levers and the traction element is pre-tensioned in accordance to its mode of operation only so far as required by the power flow and is thus freed of unnecessary wear.

BRIEF DESCRIPTION OF THE DRAWINGS

The invention will now be described with reference to one example of embodiment. In the drawings.

DETAILED DESCRIPTION OF THE DRAWINGS

Figure 1:
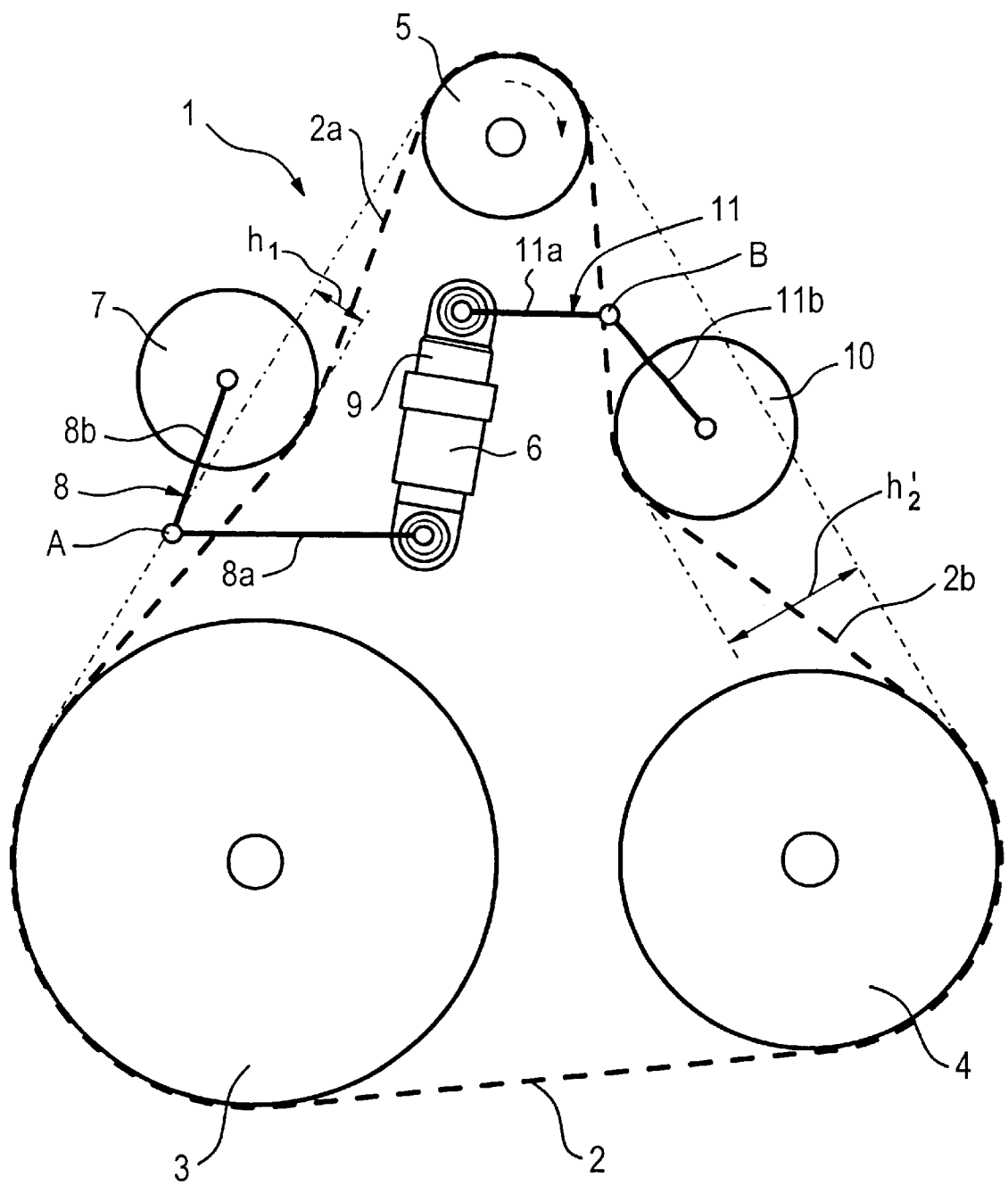
FIG. 1 is a schematic representation of a belt drive of an internal combustion engine with an integrated starter-generator unit and a tensioner unit of the invention, with the starter-generator unit operating as a starter.

In FIG. 1, a belt drive of an internal combustion engine is identified at 1. The belt drive comprises a belt 2, shown in broken lines, the belt pulley of the crankshaft 3, the belt pulley of an aggregate unit 4, not further specified, a belt pulley of a starter-generator unit 5 and a tensioning device 6. The belt is wrapped around the belt pulley of the crankshaft 3, the belt pulley of the starter-generator unit 5 and the belt pulley of the aggregate unit 4, and forms, between the belt pulley of the crankshaft 4 and the belt pulley of the starter-generator unit 5, a first strand 2a, and, between the belt pulley of the starter-generator unit 5 and the belt pulley of the aggregate unit 5, a second strand 2b.

During the starting operation, the belt pulley of the starter-generator unit 5 entrains, through the belt, the belt pulley of the crankshaft 3 and the belt pulley of the aggregate unit 4. The belt is pre-tensioned in the first strand 2a and in the second strand 2b by the tensioning device 6. A first tension roller 7 connected to the tensioner-damper unit 9 by a first pivoting lever 8 bears against the first strand 2a. The second strand 2b is pre-tensioned by a second tension roller 10. The second tension roller 10 is connected to the tensioner-damper unit 9 by a second pivoting lever 11.

The tensioner-damper unit is not fix ed stationary on the internal combustion engine but float-mounted between the first pivoting lever 8 and the second pivoting lever 11. The tensioning device 6 is fixed at the fulcrums A and B on the internal combustion engine. The first pivoting lever 8 is mounted for pivoting on the axis of pivot A and the second pivoting lever 11 is mounted for pivoting on the axis of pivot B.

The tensioner-damper unit 9 urges the first tension roller 7 against the first strand 2a. The leverage resulting from the ratio of the lengths of an inner lever arm 8a and an outer lever arm 8b is now effective. The second tension roller 10 is pre-tensioned under the action of a leverage that results from the ratio of the lengths of an inner lever arm 11a and an outer lever arm 11b.

During the starting operation, the belt pulley of the starter-generator unit 5 entrains the belt pulley of the crankshaft 3 and the belt pulley of the aggregate unit 4. The belt pulleys 3, 4, 5 then rotate in clockwise direction. In this state, the first strand 2a is a tight strand and yields elastically under the action of the tensioning device 6 by the amount $h_1$ which stands for the positional deviation of the strand 2a from an imaginary, theoretical ideal position during the starting operation. The second strand 2b deviates from its theoretical ideal position by the amount $h_2'$.

Figure 2:
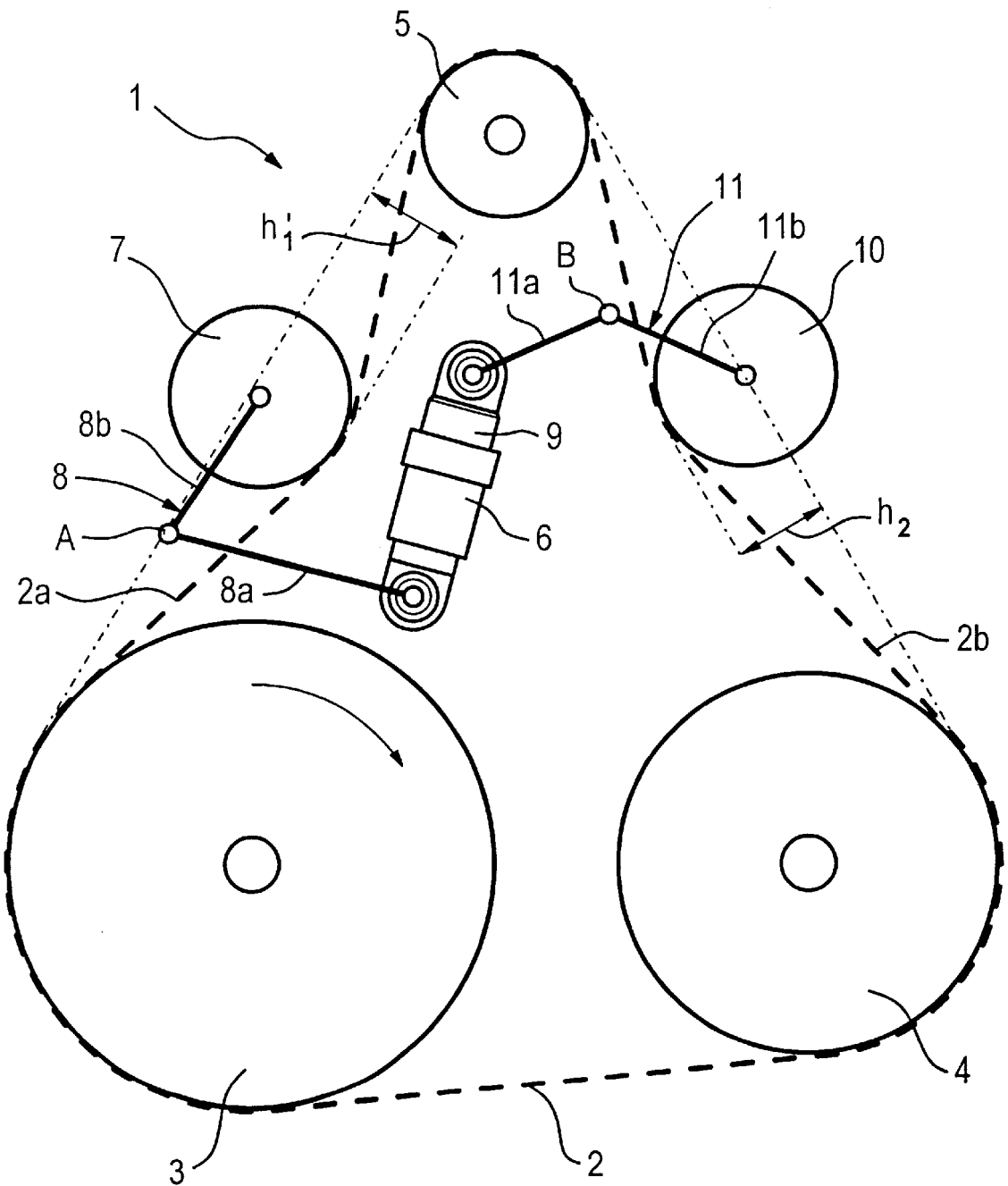
FIG. 2 is the schematic representation of the belt drive of FIG. 1, with the starter-generator unit operating as a generator.

In the schematic view of the belt drive 1 shown in FIG. 2, in contrast to the representation of FIG. 1, the belt pulley of the crankshaft 3 entrains the belt pulley of the aggregate unit 4 and the belt pulley of the starter-generator unit 5. The first strand 2a is a slack strand while the second strand $2b_1$ in this case, is a tight strand. The starter-generator unit operates in this case as a generator. Under the action of the tensioning device 6, the first strand 2a deviates from its imaginary, theoretical ideal position by the amount $h_1'$ while the second strand 2b moves away from its imaginary, theoretical ideal position by the amount $h_2$.

Figure 3:
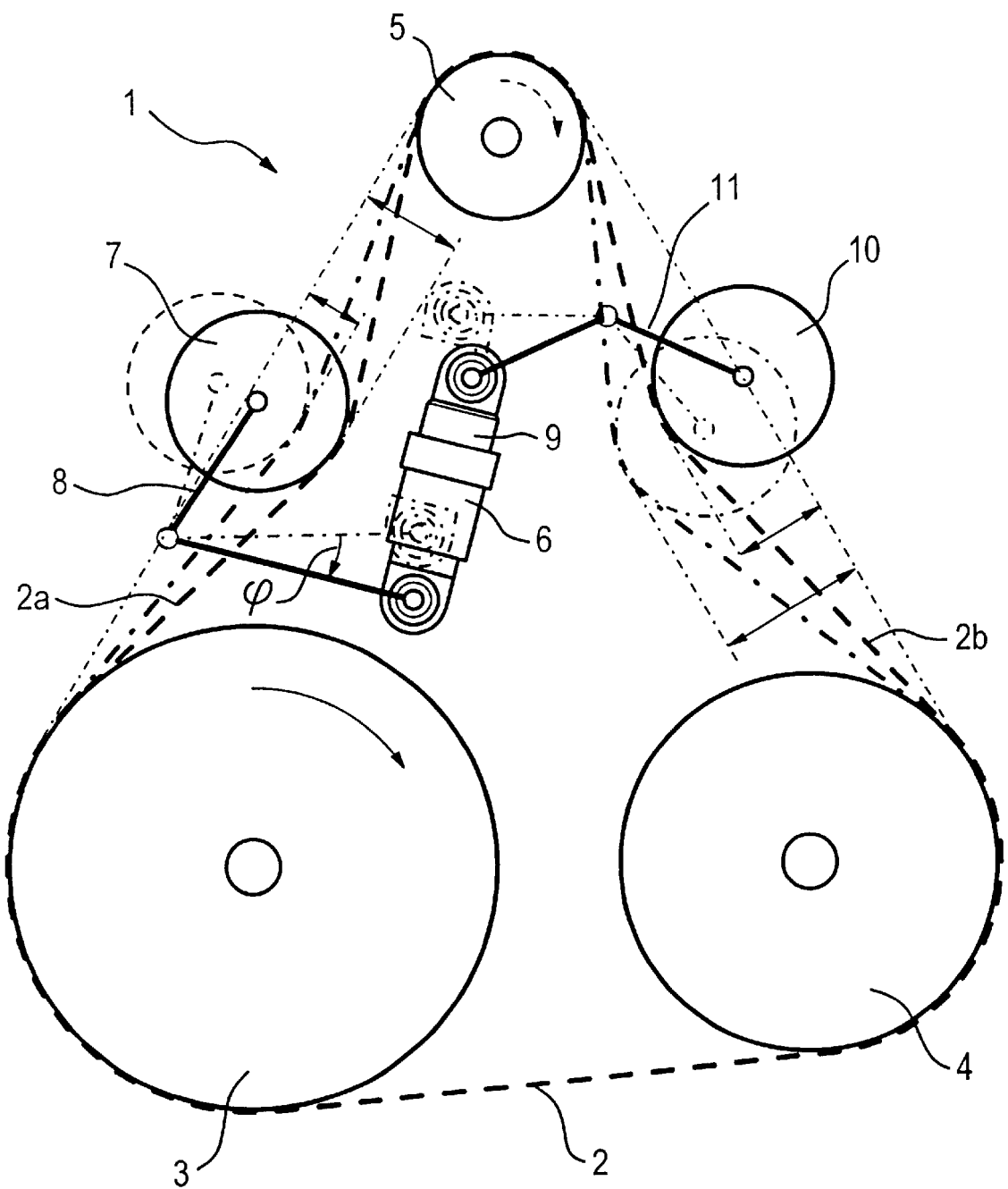
FIG. 3 is the schematic representation of the belt drive of FIG. 1 showing the different positions of the tensioner unit during the operation of the starter-generator unit as a starter compared to its operation as a generator.

In the representation of FIG. 3, the positions of the tensioning device 6 of the belt drive 1 have been superposed on each other. This representation is intended to facilitate a comparison between the positions of the tensioning device 6 during the action of entrainment by the starter-generator unit 5 represented in FIG. 1 and the action of entrainment by the crankshaft illustrated in FIG. 2. The broken-line fragmentary representation of the tensioning device 6 shows the position of this tensioning device 6 during the action of entrainment by the starter-generator unit. When the aggregate units of the belt drive 1 are entrained by the belt pulley of the starter-generator unit 5, the tractive forces in the strand 2b are low and those in the strand 2a are higher because the strand 2a then constitutes the tight strand. The tight strand offers a resistance to the tensioning force of the tensioning device 6 so that, on the side of the strand 2a, the belt 2 is pre-tensioned only by the amount $h_1$. On the other side of the belt pulley of the starter-generator unit 5, the belt is deflected by a correspondingly larger amount $h_2'$ because in this mode of operation, the strand 2b forms a slack strand in the belt 2 with lower tractive forces. When the internal combustion engine has been started, the belt pulley of the crankshaft 3 takes over the entrainment of the aggregate units of the belt drive 1. The tractive forces in the strand 2a become smaller and those in the strand 2b, in contrast, higher. The strand 2b becomes the tight strand and the belt 2 is therefore tightened on the side of the strand 2b. The second tension roller 10 is moved outwards by the belt 2 and transmits this movement as a pivoting motion about the fulcrum B, through the pivoting lever 11, to the tensioner-damper unit 9. The tensioner-damper unit 9 transmits this motion to the first pivoting lever 8 that pivots about the fulcrum A through the angle φ. Under the action of this pivoting motion, the first tension roller 7 pre-tensions the strand 2a by the larger amount $h_1'$.

Reference Numerals

1 Belt drive
2 Belt
2a First strand
2b Second strand
3 Belt pulley of the crankshaft
4 Belt pulley of an aggregate unit
5 Belt pulley of a starter-generator unit
6 Tensioning device
7 First tension roller
8 First pivoting lever
8a Inner lever arm of the first pivoting lever
8b Outer lever arm of the first pivoting lever
9 Tensioner-damper unit
10 Second tension roller
11 Second pivoting lever
11a Inner lever arm of the second pivoting lever
11b Outer lever arm of the second pivoting lever

What is claimed is:

1. A tensioning device (1) for a traction element (2) of a drive arrangement, said tensioning device comprising a tensioner-damper unit (9), a first tension element (7) in contact with the traction element (2) and a second tension element (10) in contact with the traction element (2), with the following features:

the tensioner-damper unit (9) acts between a first pivoting lever (8) and a second pivoting lever (11), the first tension element (7) is connected to the first pivoting lever (8), the first pivoting lever (8) is mounted on a fulcrum for pivoting about a first fixed axis of pivot, the first tension element (7) is urged by the first pivoting lever (8), under the action of the tensioning force of the tensioner-damper unit (9), against a first strand (2a), the second tension element (10) is connected to the second pivoting lever (11), the second pivoting lever (11) is mounted on a fulcrum for pivoting about a second fixed axis of pivot, the second tension element (10) is urged by the second pivoting lever (11), under the action of the tensioning force of the tensioner-damper unit (9), against a second strand (2b), a deflector pully (5) for the traction element is arranged between the first strand (2a) and the second strand (2b) and the first strand (2a) and the second strand (2b) are subjected to unequal tractive forces, characterized by the following features:

each of the first pivoting lever (8) and the second lever (11) is formed by an inner lever (8a, 11a) starting from its fulcrum and by an outer lever arm (8b, 11b) starting from its fulcrum, the free end of each outer lever arm (8a, 11b) is connected to the tension element (7, 10) associated thereto, the free end of each inner lever arm (8b, 11a) is articulated on one end of the tensioner-damper unit (9), the tensioner-damper unit (9) is float-mounted between the inner lever arms (8b, 11a) and transmits the reaction forces occurring during the tensioning operation between the first strand (2a) and the second strand (2b), the length of the inner lever arm (8a) and the outer lever arm (8b) of the first pivoting lever (8) and the length of the inner lever arm (11a) and of the outer lever arm (11b) of the second pivoting lever (11) form a ratio that is adapted to the unequal tractive forces, the length of the inner lever arm (8a) and of the outer lever arm (8b) of the first pivoting lever (8) form a ratio that produces a pre-tensionsing force on the first strand (2a), which pre-tensioning force is different in magnitude from a pre-tensioning force produced by the second pivoting lever (11) on the second strand (2b).

2. A tensioning device according to claim 1, characterized in that the tensioner-damper unit (9) is formed by a hydraulic belt tensioner.

3. A tensioning device according to claim 1, characterized in that the traction element is a belt (2) of a belt drive (1) of an internal combustion engine, and the deflector pulley is the belt pulley of a starter-generator unit (5).

* * * * *